United States Patent [19]
Tomori

[11] Patent Number: 4,627,691
[45] Date of Patent: Dec. 9, 1986

[54] CAM GROOVES FOR DISPLACING LENSES

[75] Inventor: Yasumasa Tomori, Sakado, Japan

[73] Assignee: Asahi Kogaku Kogyo Kabushiki Kaisha, Tokyo, Japan

[21] Appl. No.: 682,808

[22] Filed: Dec. 17, 1984

Related U.S. Application Data

[63] Continuation of Ser. No. 597,206, Apr. 6, 1984, abandoned, which is a continuation of Ser. No. 212,140, Dec. 2, 1980, abandoned.

[30] Foreign Application Priority Data

Dec. 4, 1979 [JP] Japan .................. 54-156378

[51] Int. Cl.$^4$ .................................. G02B 15/00
[52] U.S. Cl. .................................. 350/429
[58] Field of Search ................... 350/429, 430

[56] References Cited

U.S. PATENT DOCUMENTS

| | | | |
|---|---|---|---|
| 3,655,271 | 4/1972 | Suzuki | 350/430 |
| 3,992,083 | 11/1976 | Tanaka | 350/429 |
| 4,148,548 | 4/1979 | Thompson | 350/429 |
| 4,162,822 | 7/1979 | Nonogaki | 350/429 |

Primary Examiner—John K. Corbin
Assistant Examiner—Paul M. Dzierzynski
Attorney, Agent, or Firm—Fleit, Jacobson, Cohn & Price

[57] ABSTRACT

Cam grooves for displacing lenses of an optical system in which lenses or lens groups are displaced in parallel to an optical axis by a lens-operating ring mounted on a support barrel rotatable about the optical axis, but not shifted in parallel to the optical axis. The cam grooves are provided by obtaining the maximum lengths of displacement of vari-focal lenses, among the lengths of displacement of the one or more lenses or one more lens groups, in respective equal-difference minute ranges between respective changed focal lengths, over the entire range of a train of varying focal lengths or photographic distance; and by applying lead angles as slope of cam grooves to the respective maximum lengths of displacement of the lenses.

3 Claims, 22 Drawing Figures

CAM GROOVES FOR DISPLACING LENSES

This application is a continuation of application Ser. No. 597,206, filed Apr. 6, 1984, which is a continuation of Ser. No. 212,140, filed Dec. 2, 1980, both now abandoned.

BACKGROUND OF THE INVENTION

1. Field of the Invention

This invention relates to cam grooves for an optical system such as a zoom lens system or a super-telephoto lens system, wherein at least more than two lenses, or two or more lens groups, are displaced in parallel to an optical axis.

2. Description of the Prior Art

In a zoom lens, one or more lenses or one or more lens groups of a plurality of lens groups which constitute the zoom lens must be displaced, in order to maintain a focusing plane usually constant, even with a change of a focal length. The state of displacement of such lenses varies, because the lengths of displacement of such lenses are determined in a manner that various aberrations in a train of focal lengths in permissible focal range do not cause an undesired influence.

Particularly in a super-telephoto lens, system, if all of the lens groups are displaced, as an aerial space between lens groups remains consistent, in order to focus the lenses, then large lengths of displacement of such lenses result. To cope with this, it has been customary to displace one or more lens or one or more lens groups of the plural lens groups in order to diminish the lengths of displacement of the lenses and reduce a macro-photographic distance. The states of displacement of such lenses are various, in order to maintain constant various factors such as chromatic aberration, etc.

The states of displacement of such lenses are defined, on the optical design, as a train of displacements in the permissible focal range, namely, as focal lengths in a zoom lens and as a photographic distance in a super-telephoto lens system. Cam grooves in an optical system are designed by making an angle of rotation about an optical axis or a length of displacement parallel to the optical axis, of a lens operating member properly correspond to a changing focal length or photographic distance. A configuration of a cam groove is thus dependent on a degree of displacement, or an angle of rotation about an optical axis, of the lens operating member corresponding to a changing focal length or photographic distance.

SUMMARY OF THE INVENTION

It is an object of the present invention to provide cam grooves in an optical system having two or more displaceable lenses, wherein irrespective of the states of displacement (displacement curves) of such lenses, design of a cam groove is easy; and the machining accuracy of cam grooves as well as the strengths of a lens operation ring and a support barrel for the lens operation ring are ensured; whereby cam grooves exhibiting a good operation ability are provided.

DESCRIPTION OF THE PREFERRED EMBODIMENTS

In FIGS. 1 through 12 there are shown zoom lens systems having two vari-focal lens groups, and cam grooves provided by conventional means. FIGS. 1 through 6 show cam grooves in a zoom lens system, wherein a vari-focal lens operation member is displaced a distance equivalent to a length of displacement of one of two vari-focal lens that are displaced to effect a change. The displacement distance is equal to the larger displacement length in the entire permissible focal range. The operation member is adapted to displace both lenses, while usually increasing or decreasing the state of change. A member for retaining the other vari-focal lens is turned according to the length of displacement of the aforesaid lens operation member, whereby the degree of rotation of the other-vari-focal-lens-retaining-member and the length of displacement of the vari-focal lens are correlated to provide cam grooves. Throughout the drawings, only components necessary for explanation are shown for the sake of simplicity.

An operation rinq (a cam ring) 1' is slidably fitted on a support barrel 2 having a fitting portion for a camera body. Vari-focal lenses A and B are retained on lens frames 3 and 4. The lens frame 4 is slidably fitted into the support barrel 2. A guide pin 7a is positioned on the lens frame 3 and is rigid with the operation ring 1', so as to integrally associate the operation ring 1' with the lens frame 4. A guide slot 2a runs in the support barrel 2 in parallel to the optical axis and has a length corresponding to a length of displacement $a_n$ of the vari-focal lens A. The guide slot 2a receives therein the guide pin 7a slidably therealong, so that the operation ring 1' may be shifted only in a direction of an optical axis, but does not rotate about the optical axis. A linear lead groove 4a is provided in the lens frame 4 and receives slidably therein the guide pin 7a. A guide pin 7b is positioned on the lens frame 4 and is slidably fitted into a cam groove 2b provided in the support barrel 2. In FIGS. 1 through 4, the right side in each drawing is the camera side, namely, the side of an image forming plane.

Figure 1:
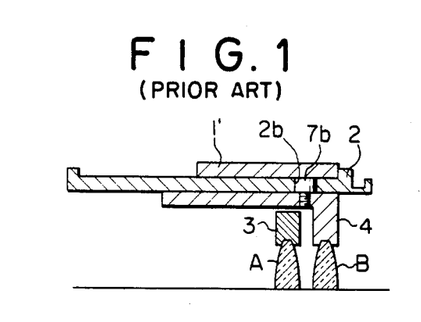
FIGS. 1 and 2 are fragmentary longitudinal cross-sectional views of a zoom lens system consisting of two vari-focal lenses, and having cam grooves for controlling displacement of the lenses.
Figure 2:
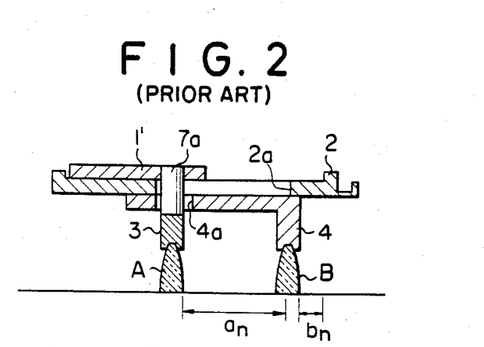

In operation, when the lens-operation ring 1' is slidingly shifted from the widest angle-of-view condition shown in FIG. 1 to the left in FIG. 1, the vari-focal lens A is displaced a distance equal to the length of shift of the operation ring 1' by means of the lens frame 3, whereby the lens frame 4 is turned in association with the relative movement of the guide pin 7a to the guide slot 2a and the lead groove 4a. In association with the relative movement of the guide pin 7b positioned on the lens frame 4 to the cam groove 2b, the vari-focal lens B is displaced to provide the narrowest angle-of-view condition shown in FIG. 2. Stated otherwise, if a focal length is varied from the state of FIG. 1 to the state of FIG. 2, then the vari-focal lens A is displaced a length $a_n$ while increasing a length of displacement, and the vari-focal lens B is displaced a length $b_n$.

Figure 3:
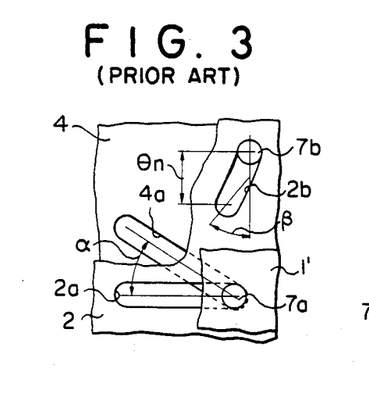
FIGS. 3 and 4 are developed views of the cam grooves of FIGS. 1 and 2, respectively.
Figure 4:
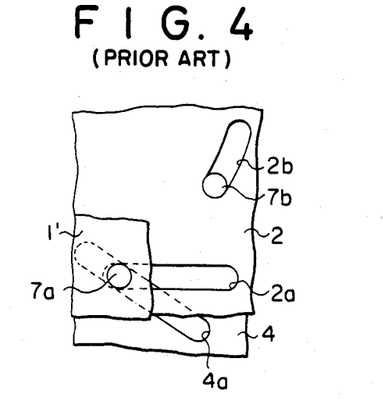

Assuming that L is representative of a lead of the lead groove 4a, then an angle of development $\theta_n$, as viewed from the optical axis, of the cam groove shown in FIG. 3 is expressed by:

$$\theta_n = (360°/L) \times (a_n - b_n) \quad (1)$$

The locus (or a configuration) of the cam groove 2b is determined by obtaining a value of $\theta$ in a train of focal lengths, according to the equation (1).

A lead angle of the lead groove 4a is constant, and, on the other hand, a lead angle $\beta$ representing a slope of the cam groove 2b is in general dependent on respective focal lengths changed.

Figure 5:
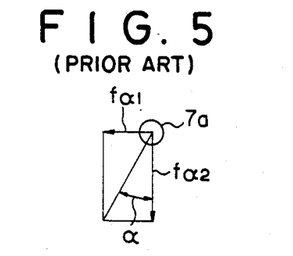
FIGS. 5 and 6 illustrate the relationships of forces resulting from the configurations of the cam grooves of FIGS. 3 and 4.
Figure 6:
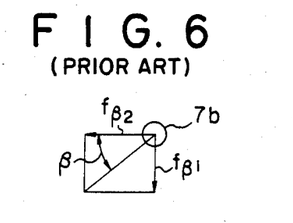

The relationships of the lead angles $\alpha$ and $\beta$ with the force of shifting the operation ring 1' to the front and rear in parallel to the optical axis are shown in FIGS. 5 and 6, respectively. Assuming that $f\alpha_1$ is representative of the force acting on the guide pin by way of the operation ring 1', then the force of rotating the lens frame 4 is $f\alpha_2$. If a rotational force acting on the guide pin 7b by way of the lens frame 4 is assumed of $f\beta_1$, then the force of displacing the operation ring in parallel to the optical axis is $f\beta_2$. It is seen from FIGS. 5 and 6 that, in case of small lead angles $\alpha$ and $\beta$, only a small operational force $f\alpha_1$ results, with the good operational ability. For this reason, it is usual to set the lead angles $\alpha$ and $\beta$ at less than 45°. However, reduction of the lead angle $\alpha$, namely, reduction of the lead L, leads to increase in $\theta_n$ obtained by the equation (1), resulting in reduction of the lead angle $\beta$. Thus, the lead L is changed in various ways, so as to find an optimum locus of the cam groove 2b.

FIGS. 7 through 12 show cam grooves available for the case where the state of displacement of a vari-focal lens increases or decreases, or the case where a difference in a length of displacement between two vari-focal lenses is not so large. In this embodiment, the cam grooves are provided by turning the vari-focal lens operation member about the optical axis and making an angle of rotation of the lens-operation member correspond to a changed focal length. The components equivalent in function to those of FIGS. 1 through 6 are denoted by the same reference numerals as those in FIGS. 1 through 6.

Figure 7:
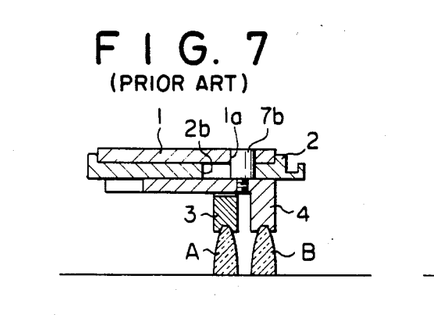
FIGS. 7 and 8 are fragmentary longitudinal cross-sectional vies of another zoom lens system consisting of two vari-focal lenses and having cam grooves for controlling displacement of the lenses.
Figure 8:
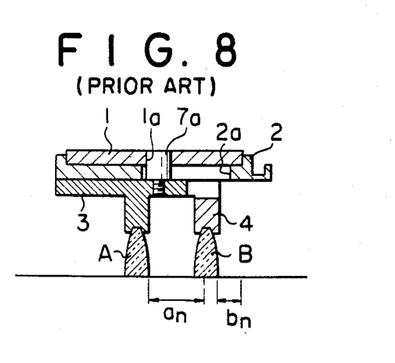

An operation ring 1 is fitted on a support barrel 2 having a fitting portion for a camera body in a manner to be free to rotate about an optical axis, but not to shift to the front and rear of the camera in parallel to the optical axis. Vari-focal lenses A and B are supported by lens frames 3 and 4, respectively. A guide pin 7a is positioned on the lens frame 3 and fitted into a guide slot 2a running in the support barrel 2 in parallel to the optical axis and a lead groove 1a provided in the operation ring 1. The guide slot 2a has a length corresponding to a length of displacement of the vari-focal lens A. Another guide pin 7b is positioned on the lens frame 4 and slidably fitted into a guide slot 2b running in the support barrel 2 in parallel to the optical axis and a cam groove 1b running in the operation ring 1.

When the lens operation ring 1 is turned from the widest angle-of-view condition of FIG. 7, then the lens frame 3 is shifted to the left in parallel to the optical axis in association with the relative movement of the guide pin 7a to the guide slot 2a and the lead groove 1a, thereby displacing the vari-focal lens A. Simultaneously therewith, the lens frame 4 is shifted straight in parallel to the optical axis to the left in association with the relative movement of the guide pin 7b to the guide slot 2b and the cam groove 1b, thereby displacing the vari-focal lens B, to thereby provide a focal length equivalent to the narrowest angle-of-view condition shown in FIG. 8. Stated otherwise, if the focal length is changed from the state of FIG. 7 to the state of FIG. 8, the vari-focal lens A is displaced a distance $a_n$ and the vari-focal lens B is displaced a distance $b_n$.

Figure 9:
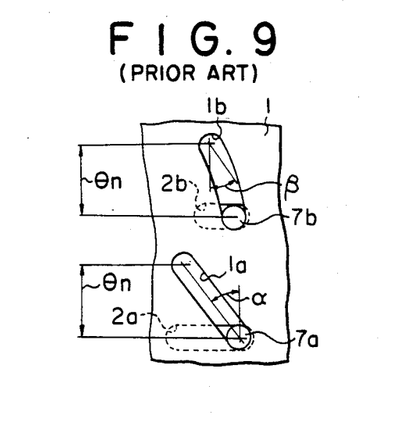
FIGS. 9 and 10 are developed views of the cam grooves of FIGS. 7 and 8, respectively.
Figure 10:
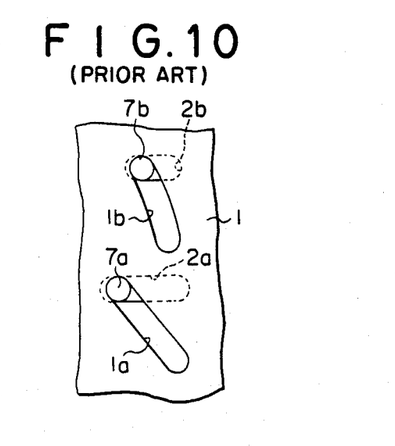

Supposing L is representative of the lead of the lead groove 1a, and angle of rotation $\theta_n$ of the operation ring 1 shown in FIG. 9 is expressed by the equation:

$$\theta_n = (360°/L) \times a_n \quad (2)$$

The locus (or a configuration) of the cam groove 2b is determined by obtaining a value of $\theta_n$ in a train of focal lengths changed, according to the equation (2).

A lead angle $\alpha$ of the lead groove 1a is constant, but a lead angle $\beta$ of the cam groove 1b is in general variant with respective changed focal lengths.

Figure 11:
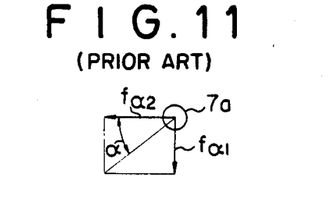
FIGS. 11 and 12 illustrate the relationships of forces resulting from the configurations of the cam grooves of FIGS. 9 and 10.
Figure 12:
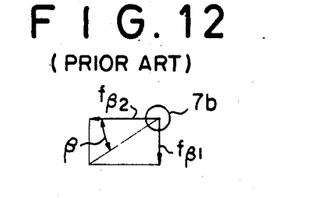

The relationship between the lead angle $\alpha$ and the force of operating the operation of ring 1 and the relationship between the lead angle $\beta$ and the force of operating the operation ring 1 are shown in FIGS. 11 and 12, respectively. Assuming that $f\alpha_1$ and $f\alpha_2$ are representative of the rotational forces acting on the guide pins 7a and 7b when the operation ring 1 is turned, then the forces of moving the guide pins 7a and 7b straight in parallel to the optical axis are $f\alpha_2$ and $f\beta_2$, respectively. From FIGS. 11 and 12 it is seen that small lead angles $\alpha$ and $\beta$ result in small rotational forces $f\alpha_1$ and $f\beta_1$, with the improved operation ability. For this reason, it is usual that the lead angles $\alpha$ and $\beta$ are set at less than 45°. However, reduction of the lead angle $\alpha$, namely, reduction of the lead L, results in increase in $\theta_n$ which is obtained by the equation (2).

FIGS. 13 through 20 show a zoom lens optical system for use in a 35 mm camera having a permissible focal length from 28 mm to 135 mm, wherein the zoom lens system consists of four vari-focal lens groups, and these vari-focal lenses are displaced a different length from each other. The components equivalent to those in the preceding embodiments are shown by the same reference numerals. An operation ring 1 is fitted on a support barrel 2 having on the right side the fitting portion for a camera body, in a manner to be free to turn about the optical axis, but not to shift in parallel to the optical axis. Lens frames 3,4,5 and 6 retain vari-focal lenses A,B,C and D. A guide pin 7a is positioned on the lens frame 3 and slidably fitted into a guide slot 2a provided in the support barrel 2 in parallel to the optical axis and having a length corresponding to the maximum length of displacement of the vari-focal lens A. The guide pin 7a is also slidably fitted into a cam groove 1a provided in the operation ring 1. Guide pins 7b,7c and 7d are positioned on the lens frames 4,5 and 6, and slidably fitted into guide slots 2b,2c and 2d and cam grooves 1b,1c and 1d provided in the operation ring 1, the aforesaid guide slots running in the support barrel 2 in parallel to the optical axis and having lengths corresponding to the maximum lencths of displacement of the vari-focal lenses B,C and D, respectively. When the operation ring 1 is turned, the lens frames 3,4,5 and 6 are displaced straight in association with relative movements of the guide pins 7a,7b,7c and 7d with respect to the guide slots 2a,2b,2c and 2d and cam grooves 1a,1b,1c and 1d, thereby displacing the vari-focal lenses A,B,C and D, respectively, thereby changing a focal length.

Figure 13:
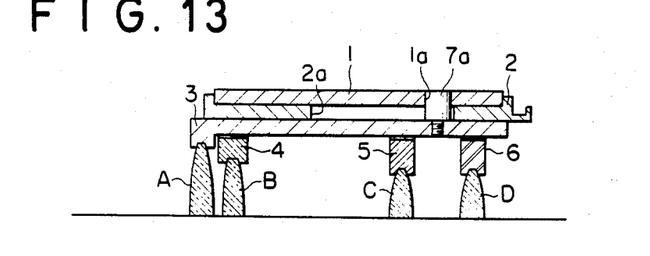
FIGS. 13 through 16 are fragmentary longitudinal cross-sectional views of a zoom lens system consisting of 4 vari-focal lenses, and having cam grooves for controlling displacement of the lenses.
Figure 14:
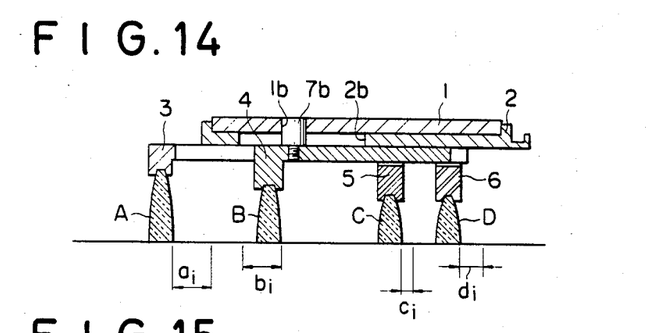
Figure 15:
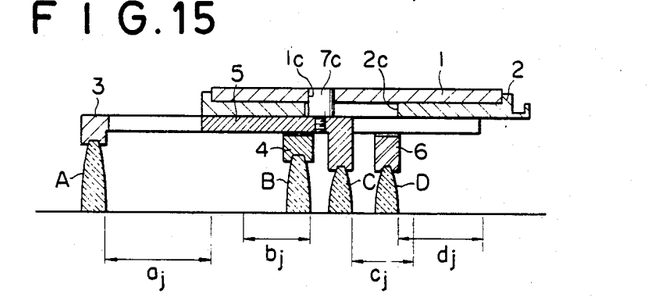
Figure 16:
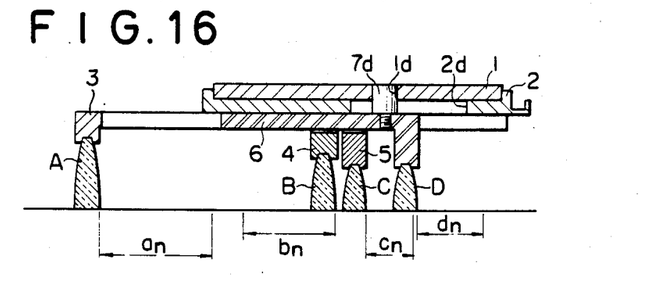
Figure 17:
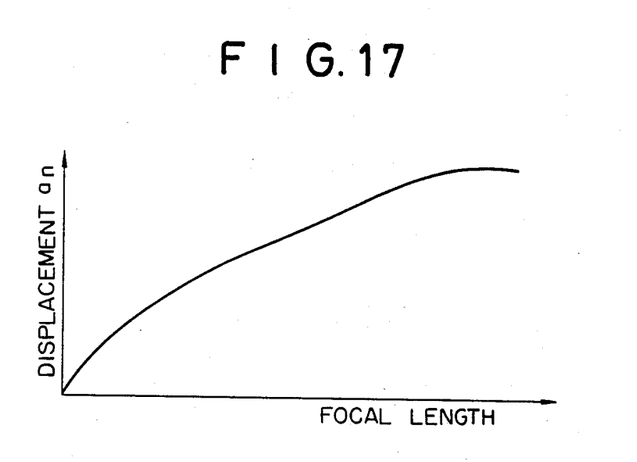
FIGS. 17 through 20 are graphs indicating the states of displacement of respective vari-focal lenses illustrated in FIGS. 13 to 16.

FIG. 13 shows the widest angle-of-view condition, FIGS. 14 and 15 show intermediate angle-of-view conditions shifting from the focal length in FIG. 13 to the focal length of FIG. 16, and FIG. 16 shows the narrowest angle-of-view condition. FIGS. 17 through 20 show the states of lengths of displacement of the vari-focal lenses A,B,C and D in respective changed focal lengths, starting with the change of the widest angle-of-view condition to the narrowest angle-of-view condition. The focal lengths are indicated along the abscissa (increasing toward the right), as an angle of view changes from the left to the right. Lengths of displacement of respective vari-focal lenses are indicated along the ordinate, wherein length of displacement of respective vari-focal lens to the left (to the side of an object) as viewed in FIGS. 13 through 16 are illustrated in the upper part of respective graphs.

In determining a locus of a cam groove according to the conventional means, the curves of displacement in FIGS. 17 through 20 must be reviewed.

Figure 18:
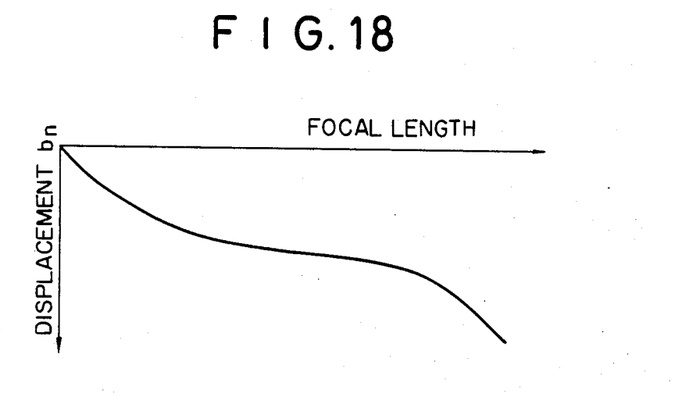
Figure 19:
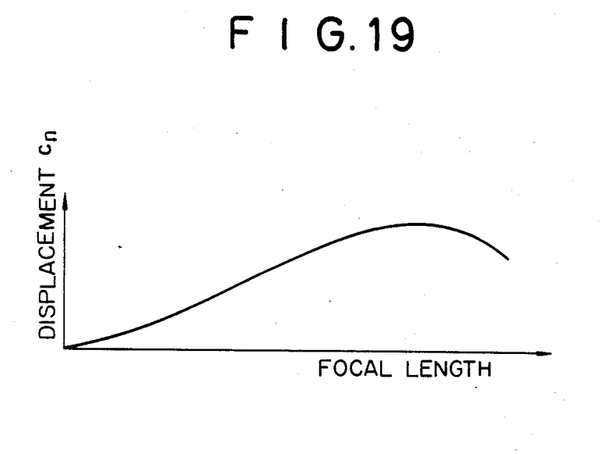
Figure 20:
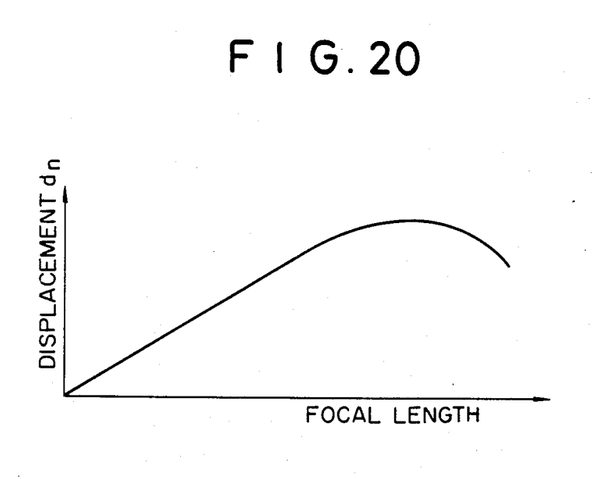

Among these curves, a constantly increasing or decreasing curve, namely, a curve being solely negative or positive on tangent at any point on the curve, is selected, and a linear cam groove is provided on the basis of the curve. The displacement curve of FIG. 18 corresponds to such a curve. In the curve of FIG. 18, a lead groove having a lead L can be provided for the cam groove 1b which regulates the movement of the vari-focal lens B. An angle of rotation $\theta_n$ of the operation ring 1, in this case, is expressed by the following equation, if a length of displacement of the vari-focal lens B is assumed to be $b_n$;

$$\theta_n = (360°/L) \times b_n \qquad (3)$$

Based on the lengths of displacement $a_n$, $c_n$ and $d_n$ of the vari-focal lenses A,C and D which correspond to the length of displacement $b_n$ of the vari-focal lens B, and the angle of rotation of the ring 1, the loci of the cam grooves 1a,1c and 1d are determined. These cam grooves are shown in development in FIG. 21, wherein an angle of rotation $\theta$ of the operation ring 1 is taken along the abscissa and lengths of displacement of the lenses are taken along the ordinate. From FIG. 21 it is seen that the maximum lead angles $\alpha$, $\gamma$, and $\delta$ of cam grooves 1a,1c and 1d are all larger than the lead angle $\beta$ of the linear cam groove 1b, and are more than 45°, resulting in poor performance.

Figure 21:
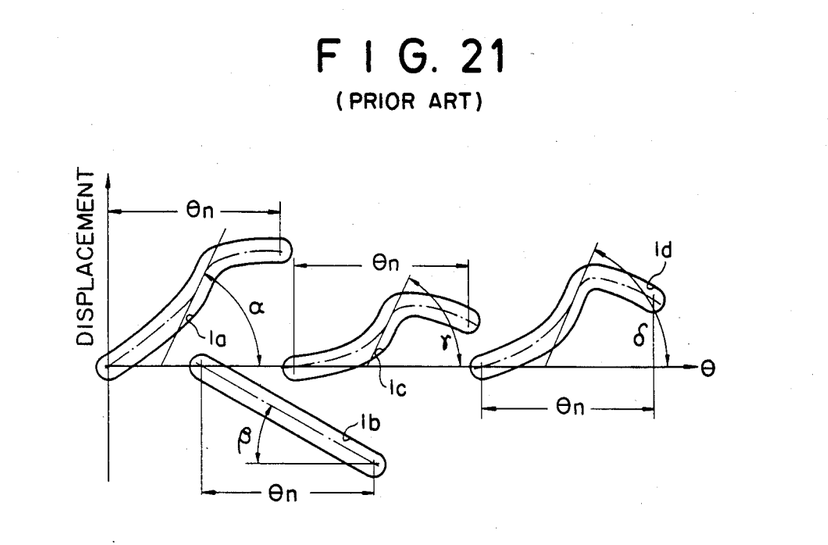
FIG. 21 shows developed views of cam grooves designed according to a conventional method.

In order to reduce the maximum lead angles $\alpha$, $\gamma$ and $\delta$ to less than 45°, the lead angle $\beta$ must be reduced, namely, the lead L must be reduced. Consequently, the angle of rotation $\theta_n$ of the lens operation ring 1 increases, and respective grooves increase in length eventually to such an extent a would interfere with each other. It would be accordingly impossible to provide cam grooves in the operation ring 1, or to provide such long cam grooves in the operation ring 1 would impair the strength of the operation ring 1, and lead to poor machining accuracy. In order to ensure the machining accuracy of such long cam grooves, a configuration of such cam grooves heretofor, must be rectified, for ease of machining, at a sacrifice of movement or an optical performance of the vari-focal lens groups.

The angle of rotation $\theta_n$ of the lens-operation ring 1 is set by applying a certain lead angle most suited for formation of a cam groove to a length of displacement of a vari-focal lens which can provide the maximum length of displacement, among the lengths of displacement of the vari-focal lenses A,B,C and D, in the same focal length changed. Points of displacement of respective vari-focal lenses in respective focal lengths changed and the lengths of displacement of respective lenses in equal-difference minute ranges between points of displacement, which is the equal-difference minute ranges, are assumed as being shown in the following table.

| Focal Lengths Changed | Vari-focal Lenses | | | |
|---|---|---|---|---|
| | A | B | C | D |
| $f_1$ | $a_1$ | $b_1$ | $c_1$ | $d_1$ |
| | $> \Delta a_1$ | $> \Delta b_1$ | $> \Delta c_1$ | $> \Delta d_1$ |
| $f_2$ | $a_2$ | $b_2$ | $c_2$ | $d_2$ |
| . | . | . | . | . |
| . | . | . | . | . |
| $f_i$ | $a_i$ | $b_i$ | $c_i$ | $d_i$ |
| | $> \Delta a_i$ | $> \Delta b_i$ | $> \Delta c_i$ | $> \Delta d_i$ |
| $f_{i+1}$ | $a_{i+1}$ | $b_{i+1}$ | $c_{i+1}$ | $d_{i+1}$ |
| . | . | . | . | . |
| . | . | . | . | . |
| $f_j$ | $a_j$ | $b_j$ | $c_j$ | $d_j$ |
| | $> \Delta a_j$ | $> \Delta b_j$ | $> \Delta c_j$ | $> \Delta d_j$ |
| $f_{j+1}$ | $a_{j+1}$ | $b_{j+1}$ | $c_{j+1}$ | $d_{j+1}$ |
| . | . | . | . | . |
| . | . | . | . | . |
| $f_{n-1}$ | $a_{n-1}$ | $b_{n-1}$ | $c_{n-1}$ | $d_{n-1}$ |
| | $> \Delta a_{n-1}$ | $> \Delta b_{n-1}$ | $> \Delta c_{n-1}$ | $> \Delta d_{n-1}$ |
| $f_n$ | $a_n$ | $b_n$ | $c_n$ | $d_n$ |

In the Table, $a_1 \ldots a_n$, $b_1 \ldots b_n$, $c_1 \ldots c_n$ and $d_1 \ldots d_n$ respectively represent displacements of the vari-focal lenses A,B,C and D in respective focal lengths changed, and $\Delta a_1 \ldots \Delta a_{n-1}, \ldots \Delta b_1 \ldots \Delta b_{n-1}$, $\Delta c \ldots \Delta c_{n-1}$, and $\Delta d_1 \ldots \Delta d_{n-1}$ represent lengths of displacement of respective lenses in equal-difference minute ranges between respective focal lengths changed.

In the equal-difference minute range between the focal lengths $f_1$-$f_2$, when $\Delta a_1$ is the maximum among $\Delta a_1$, $\Delta b_1$, $\Delta c_1$ and $\Delta d_1$, then a certain lead angle $\phi$ most suited for formation of a cam groove is applied to $\Delta a_1$, and if the lead corresponding thereto is assumed to be $L\phi$, then the angle of rotation $\Delta \theta_1$ of the operation ring which can be applied to the aforesaid small range is:

$$\Delta \theta_1 = (360°/L\phi) \times \Delta a_1$$

In the small range between the focal lengths $f_i$-$f_{i+1}$, if $\Delta d_1$ is the maximum, then, $$\Delta \theta_1 = (360°/L\phi) \times \Delta d_1$$

In the small range between the focal lengths $f_j$-$f_{j+1}$, if $\Delta b_j$ is the maximum, then $$\Delta\theta_j = (360°/L\phi) \times \Delta b_j$$

In the small range between the focal lengths $f_{n-1}-f_n$, if $\Delta b_{n-1}$ is the maximum, then, $$\Delta\theta_{n-1} = (360°/L\phi) \times \Delta b_{n-1}$$

The total angle of rotation $\theta_n$ of the operation ring 1 is determined by aggregating the values $\Delta\theta_1, \ldots \Delta\theta_{n-1}$ obtained in respective minute ranges. That is to say, $\theta_n$ is obtained by:

$$\theta_n = \Sigma \Delta\theta_{n-1} = \Sigma(360°/L) \{\text{Max } \Delta(a,b,c,d)\} \quad (4)$$

wherein Max $\Delta(a,b,c,d)$ signifies use of the maximum value of the lengths of displacement $\Delta a$, $\Delta b$, $\Delta c$ and $\Delta d$ in the same focal length changed.

Figure 22:
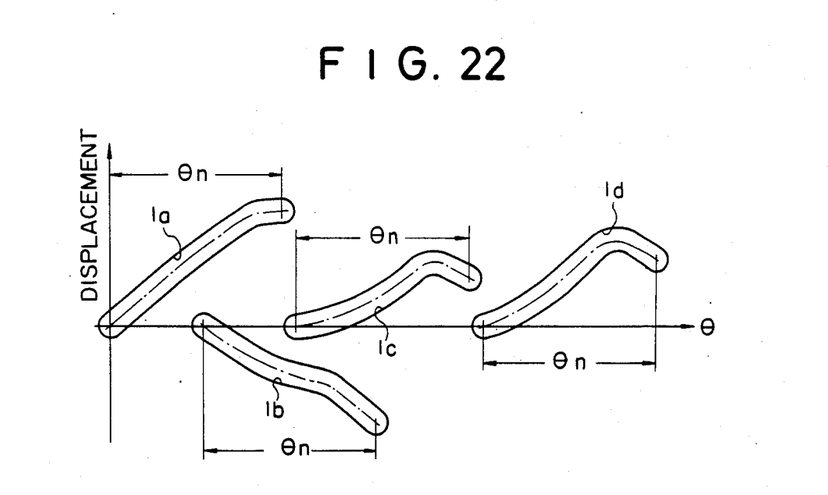
FIG. 22 shows developed views of cam grooves designed by the method of the present invention.

FIG. 22 shows a developed view of cam grooves $1a, 1b, 1c$ and $1d$, the loci of which are obtained by determining the angle of rotation of the operation ring 1 according to the equation (4), in terms of a certain lead angle $\phi$ being set at 40°. The changing lead angles $\alpha$, $\beta$, $\gamma$ and $\delta$ of cam grooves $1a, 1b, 1c$ and $1d$ shown in FIG. 22 do not exceed 40°, which is the preset lead angle $\phi$.

For the convenience of comparison between FIGS. 21 and 22, the lead angle $\beta$ of the linear lead groove $1b$ in FIG. 21 is set in a manner that the angle of rotation (an angle of development of the cam groove) $\theta_n$ of the operation ring 1 in FIG. 21 is equal to the angle of rotation $\theta_n$ of the operating ring 1 in FIG. 22.

It is obvious by comparison between FIGS. 21 and 22 that although the angle of rotation $\theta_n$ of the operation ring 1 in FIG. 21 is equal to that in FIG. 22, the locus of each cam groove formed in FIG. 21 notably differs from that of each cam groove in FIG. 22. Any of the cam grooves in FIG. 22 need not be linear, and respective cam grooves exhibit a smooth change at less than a certain lead angle.

As is apparent from the foregoing, the angle of rotation (an angle of development of a cam groove) $\theta_n$ of the operation ring 1 is so determined that an optimum lead angle for a locus of a cam groove corresponds to the maximum length of displacement of a vari-focal lens, among the lengths of displacement of vari-focal lens groups, in the same selected focal length. Thus, the minimum angle of rotation $\theta_n$ results.

Thus, the circumferential length of each cam groove is reduced, with the result that the machining accuracy as well as the strength of the operation ring are ensured. Furthermore, no restriction is imposed on the state of displacement of respective vari-focal lens, so that freeness can be afforded to optical design, and cam grooves having a good operation ability are provided.

In the above embodiments, all the guide grooves $2a$, $2b$, $2c$ and $2d$ run in parallel to the optical axis. In case there is adopted a structure in which a diaphragm aperture is variable in order to make the fully open diaphragm aperture constant, it is possible to make one of the guide grooves $2a, 2b, 2c$ and $2d$ non-parallel to the optical axis. In such a case, the lens frame and the vari-focal lens which are associated with the non-parallel guide groove must be displaced while rotating.

What is claimed is:

1. A method determining the loci of a plurality of cam grooves associated with a plurality of lenses of a lens system for guiding said plurality of lenses for movement relative to each other over a total focal length of the lens system, said method comprising:
    (a) dividing said total focal length into a plurality of minute ranges;
    (b) determining the displacement distances of said lenses over each of said minute ranges;
    (c) selecting a fixed maximum lead angle for said lens system;
    (d) selecting a lens of said lens system which experiences maximum displacement distance in one of said minute ranges;
    (e) for said one minute range, determining an angle of rotation based on said fixed maximum lead angle and maximum displacement displacement distance of said selected lens;
    (f) setting the loci of the cam groove associated with said selected lens at said fixed lead angle and for a distance determined by said angle of rotation to effectively position said selected lens in said one minute range;
    (g) for said one minute range, setting the loci of the remaining cam grooves associated with the remaining lenses at lead angles equal to or less than said fixed maximum lead angle and for distances determined by said angle of rotation to effectively position the remaining lenses; and
    (h) repeating steps (d) through (g) for each of the remaining minute ranges to set the loci of all cam grooves of said lens system so loci as said fixed maximum lead angle is present in all minute ranges over the total focal length of the lens system.

2. An optical lens system comprising:
    a plurality of lenses;
    a support barrel;
    mounting means for slidably mounting said lenses in said support barrel;
    guide slots defined by said support barrel for guiding said plurality of lenses over a total focal length;
    a lens-operating ring rotatably mounted on said support barrel for moving said plurality of lenses along said total focal length; and
    cam grooves defined by said lens operating ring associated with said plurality of lenses for displacing said plurality of lenses relative to one another and parallel to the optical axis of said lens system, and wherein said total focal length is divided into a plurality of minute ranges, and the loci of the cam grooves is characterized so that loci at a preselected fixed maximum lead angle is present in all minute ranges over the total focal length of the lens system and the remaining loci for each minute range have lead angles equal to or less than said preselected fixed maximum lead angle and at least two different cam grooves displace their associated lens at said preselected fixed maximum lead angle over at least two different minute ranges.

3. An optical system as claimed in claim 2, wherein said preselected maximum lead angle is 40 degrees.

* * * * *